United States Patent Office 3,442,995
Patented May 6, 1969

3,442,995
FABRICATION OF REVERSE OSMOSIS APPARATUS
Albert L. Bennett, Glendale, and Serop Manjikian, Del Mar, Calif., assignors to Universal Water Corporation, Del Mar, Calif., a corporation of California
No Drawing. Filed Nov. 8, 1966, Ser. No. 592,764
Int. Cl. B29b *21/52;* B29c *3/00*
U.S. Cl. 264—66                6 Claims

ABSTRACT OF THE DISCLOSURE

A process for making permeable ceramic supports for semipermeable membranes in reverse osmosis apparatus by combining 20–50 parts ball clay, up to 25 parts plastic fire clay, 10–15 parts powdered flux, 35–45 parts ground walnut shells (−60 mesh +200 mesh) with 12–25% water, forming the support shape by extrusion, drying, and firing the support to 1900° F.–2200° F. to burn out the walnut shells and form a ceramic bond. To prevent cracking the firing step is accomplished by slowly heating to 400–1500° F. to degas and decarbonize the body and raising the temperature to 1900–2200° F. to sinter the body into a strong unitary structure.

---

This invention relates to apparatus for treating solutions by reverse osmosis. More particularly it relates to a process useful for production of ceramic backing members for supporting or containing semipermeable membranes. Such backing members possesses a unique and advantageous combination of properties particularly suited for this purpose being strong, porous, relatively inexpensive, and resistant to corrosion by saline solutions.

Reverse osmosis apparatus includes a semipermeable membrane supported by a permeable or porous backing member through which solution to be purified is passed under hyperatmospheric pressure. The backing member has heretofore been most often fabricated from corrosion resistant metal such as stainless steel. Metal tubes or backing plates, which have been perforated by drilling holes at intervals over their surfaces, have been used as porous supporting members for semipermeable membranes.

Such supporting or backing members can be made to be of strength to resist the pressures employed in reverse osmosis, and be of required porosity and corrosion resistance. However, an intermediate lining material such as nylon fabric must be used to provide lateral flow from the membrane to the individual perforations in the backing member, and to support and bridge the membrane over the perforations. Additionally, this type of construction is expensive since usefully corrosion resistant metals and alloys are themselves expensive and are often costly to machine and fabricate. Applicants' invention solves the problem of material expense since ceramic construction is relatively cheap. At the same time it provides membrane backing members which are continuously, and more or less uniformly, permeable and which do not depend on spaced-apart individually drilled holes for porosity. The problem of lateral flow to such holes is therefore solved by applicants' invention and no fabric intermediate layer is required. Additionally the process invented by applicants provides a very desirable smooth yet permeable surface on which a membrane can be directly supported thus solving the problem of bridging individual perforations. Thus cost, lateral flow and bridging problems are solved and uniform high rate flux through the backing member is achieved.

Summarized briefly, this invention contemplates production of a backing member or support for a semipermeable membrane used in reverse osmosis apparatus. The backing member is characterized by being of permeable ceramic material having a smooth surface on which a membrane can be supported. It is produced by forming an intimate mixture consisting of ball clay, flux and subdivided solid combustible material with sufficient water to form a stiff mud and extruding this mud through a suitable die to produce the shape required. Ground walnut shells are preferred as the combustible material. Plastic fire clay may be substituted for part of the ball clay. The surface on which the semipermeable membrane is to be supported is formed by passage of said mixture over a die surface. After extrusion, the so-formed body is heated at a low temperature to burn out its combustible content, and is finally fired.

The mud used as extrusion feed for production of membrane backing members according to this invention will consist of ball clay or a combination of ball clay and plastic fire clay in amount from about 20 to about 50 parts by weight. If plastic fire clay is employed, it may be used in amount up to about 25 parts. Plastic kaolins or china clay may be included, as well as additional plasticizers such as ligno sulphonates, potato starch and soluble waxes. These may be employed to provide optimum characteristics for extrusion processing. A suitable powdered flux is included in the mixture in amount from about 10 to about 15 parts by weight. Certain clays may contain sufficient fluxing materials to produce suitable fired strength. Generally, fluxes should be added. Commerial fluxes comprising feldspar and other minerals may be employed; nepheline syenite is particularly useful as the flux ingredient of the mixture. Commercial fluxes which may be advantageously employed are prefused body fluxes preferably free from lead, antimony and barium. Zinc or fluorine, if present, should be below 1 to 2% by weight at which concentrations they are substantially inert. Typical compositions are (percent by weight):

|  | Percent | | |
|---|---|---|---|
|  | Flint glass | Borosilicate glass | Aluminous borosilicate glass |
| $Na_2O$ | 13.5 | 15.1 | 11.1 |
| $K_2O$ | 2.0 |  | 8.1 |
| CaO | 11.0 | 6.8 | 0.1 |
| $Al_2O_3$ | 2.0 |  | 13.2 |
| $SiO_2$ | 71.5 | 56.2 | 49.7 |
|  | 100.0 |  |  |
| $B_2O_3$ |  | 21.9 | 15.2 |
|  |  | 100.0 |  |
| ZnO |  |  | 1.0 |
| Fluorine |  |  | 1.6 |
|  |  |  | 100.0 |

The above synthetic body fluxes are amorphous, stabile silicates made by complete fusion of their constituents to a fluid molten state followed by quenching, drying and grinding. They are usually ground to 94–96% minus 200 mesh. Raw materials employed are ceramic grades of silica (commonly called "flint"), borax, soda ash, limestone (commonly called "whiting"), feldspar (soda or potash spar), zinc oxide, and fluospar. All are finely ground before batching and thoroughly mixed prior to melting. The fluxes, which are properly called glass, frit, or prefused flux, are noteworthy for their ability to impart high strength to ceramic bodies. They soften at relatively low firing temperatures (1500–1700° F.) and yet produce effective bonding action at 2000–2100° F. Their use simplifies the maturing of a ceramic body since the need for a soaking period at maximum firing temperature (i.e. glass forming and bonding period) is reduced or eliminated.

Combustible material is included as an ingredient in the mixture in amount from about 35 parts to 45 parts by weight. Solid combustible materials which may be used in the mud for extrusion will include ground walnut shells, wood powders (sawdust), coke, coal, waxes, and plastics. To provide desired porosity in the fired ceramic, this should be ground fine, finer than 40 mesh, but without an appreciable amount of extremely fine particles. A preferred size range for ground walnut shells is minus 60 plus 200 mesh.

The clay, flux and subdivided combustible material are thoroughly admixed with sufficient water to form a thick mud suitable for extrusion. This may require water in amount from 12% to about 25% of the total mixture including the water. As will be appreciated by those skilled in the art, the lower water contents within the range specified will produce bodies with lower shrinkage and may be better adapted for certain extrusion operations. Conventional equipment such as pug mill or wet pan mixer may be employed for mixing.

The mixture or "mud" is then formed into a suitable shaped body which when fired will form the ceramic backing member. The particular shape will depend on the specific apparatus design. A tubular backing tube is readily adaptable for production according to the method of this invention, as is the generally cylindrical body provided with at least one and preferably a plurality of axial tubular bores as disclosed in application Ser. No. 565,761 filed July 18, 1966. It is a feature of this invention, however, that the body produced is formed by extrusion and that the surface of the body adapted to later support the membrane will be formed by passage of the mixture over a die surface. It will not be a surface at the extrusion ends, for example, which may be produced by cutting. Passage of the mix or mud over a die surface produces a smooth yet permeable finish on that surface of the extruded body, and such a surface finish is particularly advantageous since it supports the membrane uniformly yet allows free passage of liquid. Even though its pore size is substantially finer than the rest of the extruded body this does not appreciably affect the flow therethrough because it is composed of a very thin surface film produced apparently by the action encountered in the extrusion machine.

Conventional extrusion equipment may be used, and in the case of a tubular backing tube a center pin may be used in the die to produce the internal bore as is customary. A plurality of such pins may be arranged to produce a plurality of bores in a unit body. Passage of the mix or mud over the pin surface will produce the advantageous smooth surface on this area of the extruded body, and such smooth surface will be particularly well adapted for directly supporting a semipermeable membrane as hereinbefore described.

After the backing member body has been formed by extrusion it is heated at a relatively low temperature which may be from about 100° F. to 250° F., until it is dried. Drying may take several hours or longer. After drying, the temperature to which the body is exposed is gradually raised to between about 400° F. and 1500° F. and is held within this range of temperature until the combustible material constituent is completely burnt out and the body is decarbonized and degassed. Exposure to this temperature is preferably up to 48 hours or longer if necessary. For best results the body is held at a temperature within the lower part of the defined range, that is between 400° F. and 1000° F., for up to 48 hours to slowly decarbonize and degas. This accomplishes a slow and substantially complete burning out of the combustible constituent. Degassing is carried on until the body is brought to virtually constant weight, although some carbon may still be present. The operation is preferably performed in a neutral or reducing atmosphere. After drying, and degassing and decarbonizing, the body is fired by raising its temperature to between about 1900° F. and 2200° F. Preferably the body is fired at a temperature of between about 2080° F. and about 2160° F. The more restricted firing temperature range, that is between 2080° F. and 2160° F., is preferred to provide the best combination of strength and porosity. Time at maximum temperature will be relatively short, but as will be appreciated by those skilled in the ceramic art, will be sufficient to fuse or sinter the body constituents into a strong, unitary structure. This may take 2 to 6 hours, more or less. After firing the body should be slowly cooled, for example over a period of from 12 to 24 hours.

Suitable conventional furnace or kiln apparatus may be employed for the drying, degassing and decarbonizing, and firing operations. If desired and with suitable atmospheric control, the higher temperature heating steps may be carried on in the same furnace or kiln; or they may be separately accomplished. It is preferred that the degassing and decarbonizing be carried out in a neutral or reducing atmosphere and with the temperature controlled as described. This insures that the combustible content of the body will be slowly eliminated to provied the desired pores. Too high a temperature or rapidly oxidizing conditions could cause the combustible material to ignite and flame and increase the temperature of the body to a higher level than is desirable at this stage.

The proportions of the various ingredients of the mixture to be extruded are important and critical to obtain the desired results. Ball clay is required to form the base of the mixture and substitution of plastic fire clay for a part of this may be advantageous to produce required body and plasticity characteristics for extrusion. Flux is included in amount required to provide a strong fired structure. The solid combustible material constituent is most important since this imparts the necessary porosity to the finished backing member. This affects the over all porosity and also the strength of the structure. More than the range defined will result in a very porous, but weak fired member, while less than the minimum amount will not provide adequate permeability for most efficient operation of reverse osmosis apparatus. In addition, the combustible material should be of less than 40 mesh to provide proper size pores and should preferably not contain excess fines to avoid extremely fine and disconnected pores which may be produced by extremely small particles.

The following table shows examples of compositions used for production of ceramic backing member bodies according to this invention. All parts are by weight.

TABLE

| Body | Parts | | | |
| --- | --- | --- | --- | --- |
| | W-7 | W-12 | W-13 | W-15 |
| Plastic fire clay | 24 | 24 | | |
| Ball clay | 24 | 24 | 48 | 48 |
| Nepheline syenite | 12 | | 12 | |
| Synthetic body flux | | 12 | | 12 |
| Walnut shells (−60 + 200 mesh) | 40 | 40 | 40 | 40 |

Each of the above was admixed with sufficient water to form a stiff mud. In the case of these particular examples, about 23–24% of the mud was water and the ingredients of the mud were mixed in a pug mill.

Compositions listed in the preceding table were made into muds and extruded to form backing tube bodies of tubular shape having about ½ inch inside diameter and ¼ inch wall thickness. After extrusion they were dried at between 100° F. and 200° F., then heated between 400° F. and 1500° F. to decarbonize and degas, and the bodies were then fired.

As a more specific example, backing tube bodies extruded from composition W-7 were dried at 100° F. to 150° F. over a period of about 48 hours. The dried tubes were then degassed and decarbonized by heating in an oven between about 600° F. and 1250° F. with the temperature gradually raised over a period of about 48 hours. At 600° F., degassing was visually evident and after 3 to 5 hours at about this temperature the body was still black. After 24 hours with the temperature raised to 1250° F. the color of the bodies gradually changed from gray to cream indicating decarbonizing. At the end of 48 hours the bodies appeared white. Following this the temperature was raised to a firing temperature of about 2100° F. over a period of about 24 hours to sinter and vitrify the bodies. The fixed bodies were cooled slowly over a period of 12 to 24 hours.

Tube sections of composition W–7 were tested for strength by sealing the ends and pressurizing to failure using hydraulic pressure. W–7 fired at 2106° F. burst at 400 p.s.i., and W–7 fired at 2151° F. burst at 550 p.s.i. Samples were also tested for porosity and the interconnected porosity (useful for flux or flow-through) for W–7 was determined to be about 42% of its volume. Sample of W–12, W–13 and W–15 have characteristics similar to W–7, and all samples showed smooth surfaces formed by passage of the mixture over die surface, such smooth surfaces being well adapted for direct support of a semipermeable membrane.

We claim:
1. Production of reverse osmosis apparatus having a semipermeable membrane supported by a permeable backing member through which solution to be purified is passed under hyperatmospheric pressure, wherein the improvement comprises, producing said permeable backing member by a process comprising:
  (a) forming an intimate mixture consisting essentially of by weight,
    ball clay—from about 20 to about 50 parts
    plastic fire clay—up to about 25 parts
    powdered flux—from about 10 to about 15 parts
    ground walnut shells (−60 mesh+200 mesh)—from about 35 to about 45 parts
    water—from about 12% to about 25% of the mixture;
  (b) extruding said mixture through a die to form a backing member body having a surface adapted to support a membrane formed by passage of said mixture over a surface of said die;
  (c) drying said body at a temperature of from about 100° F. to about 250° F., and when dry;
  (d) heating to degas and decarbonize said body at a temperature between about 400° F. and 1500° F.; and then,
  (e) firing said body at a temperature of from about 1900° F. to about 2200° F.
2. A process according to claim 1 in which the firing temperature in step (e) is between about 2080° F. and about 2160° F.

3. A process according to claim 1 in which the mixture formed in (a) consists essentially of, by weight,
  ball clay—from about 20 to about 50 parts
  plastic fire clay—up to about 25 parts
  nepheline syenite—from about 10 to about 15 parts
  ground walnut shells (−60+200 mesh)—from about 35 parts to about 45 parts
  water—from about 12% to about 25% of the mixture.
4. A process according to claim 1 in which the mixture formed in (a) consists essentially of, by weight;
  ball clay—from about 20 to about 50 parts
  plastic fire clay—up to about 25 parts
  powdered prefused body flux—from about 10 to about 15 parts
  ground walnut shells (−60+200 mesh)—from about 35 to 45 parts
  water—from about 12% to about 18% of the mixture.
5. A process according to claim 1 in which the mixture formed in (a) consists essentially of, by weight;
  ball clay—about 48 parts
  powdered prefused body flux—about 12 parts
  ground walnut shells (−60+200 mesh)—about 40 parts
  water—from about 12% to about 18% of the mixture.
6. A process according to claim 1 in which the die through which said mixture is extruded in (b) is of design to produce a cylindrical backing member having at least one internal bore whose surface is adapted to support a semipermeable membrane.

References Cited

UNITED STATES PATENTS

| | | | |
|---|---|---|---|
| 235,961 | 12/1880 | Praetorins | 106—45 |
| 1,825,631 | 9/1931 | Horvath | 210—23 |
| 3,176,054 | 3/1965 | Einstein et al. | 264—44 |

OTHER REFERENCES

W. C. Bell: "The Development of Light-Weight Structural Clay Products," Engineering School Bull., North Carolina State College, Bull. No. 40, 1948, pp. 9, 18–20, and 22–25.

P. William Lee: "Ceramics," 1961, pp. 185-186.

JULIUS FROME, *Primary Examiner.*

J. H. MILLER, *Assistant Examiner.*

U.S. Cl. X.R.

106—45, 46; 210—23; 264—59, 65